April 11, 1967  S. F. DEMBIAK  3,313,873
PROCESS FOR MAKING MOLDED ARTICLES WITH UNDERCUTS
Filed Feb. 11, 1965

INVENTOR.
STANLEY F. DEMBIAK
BY
ATTORNEY.

INVENTOR.
STANLEY F. DEMBIAK
BY
ATTORNEY.

United States Patent Office 3,313,873
Patented Apr. 11, 1967

3,313,873
PROCESS FOR MAKING MOLDED ARTICLES
WITH UNDERCUTS
Stanley F. Dembiak, 46 Miller St.,
Wallington, N.J. 07055
Filed Feb. 11, 1965, Ser. No. 431,872
7 Claims. (Cl. 264—134)

This invention relates to a process for making molded articles with undercuts, and to articles made thereby.

It is an object of the invention to manufacture molded articles having undercuts which will be seamless at their inside surfaces.

It is another object to provide an insert, molded from a master of the article to be molded, of such material that it may be withdrawn from the master.

It is a further object to provide such an insert which will be heat resistant so that it will not deform when used to mold the article thereon.

It is still another object to provide improved means to maintain the dimensional stability of the insert.

A further object is to provide a process by which articles having sculptured, hand carved or machined undercuts, or a combination of all three can be molded.

It is a still further object to provide a relatively inexpensive molded article of the character described which may be molded from a master or from another molded article.

Another object is to provide an improved process of the character described which shall relatively be simple and economical to carry out, and which shall be practical and efficient to a high degree in use.

Other objects of this invention will in part be obvious and in part hereinafter pointed out.

The invention accordingly consists in the steps, features of construction, combinations of elements, and arrangement of parts which will be exemplified in the construction and method hereinafter described, and of which the scope of invention will be indicated in the following claims.

In the accompanying drawing, in which is shown an illustrative embodiment of this invention, FIG. 1 is a plan view of the bottom half of the mold in position for molding the insert;

Figure 1:
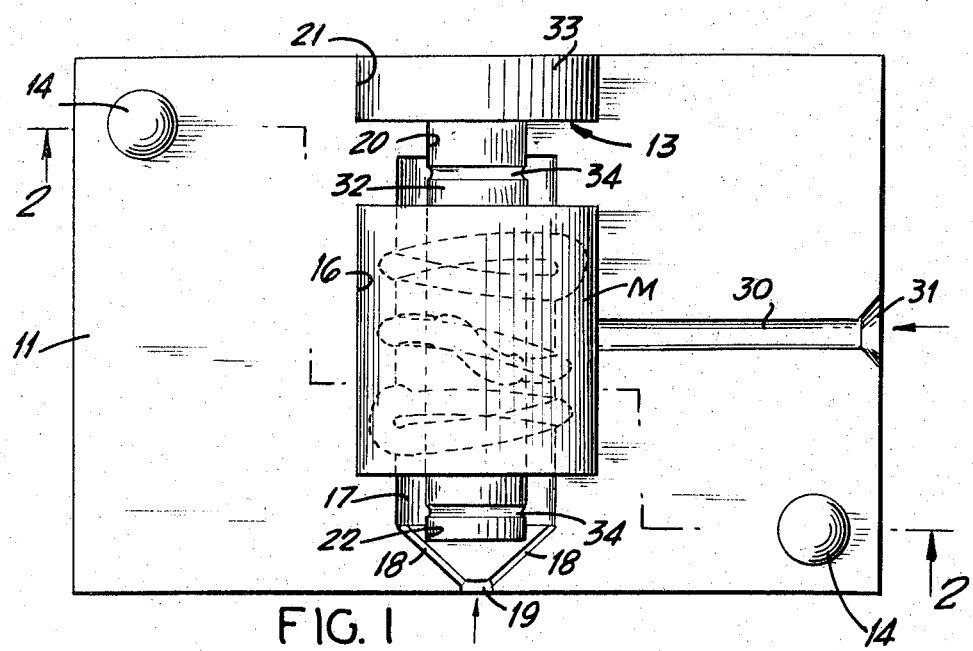

The drawings show the invention embodied in a process for making ball nuts, it being understood that the invention can be used to manufacture any article having an undercut such as ball bearing races, valve seats, lock devices and the like. Ball nuts which are machined in multiple pieces and assembled and machined again to produce seamless ball races are well known. Such prior ball nuts can be used as a master in the process according to the invention as will appear hereinafter. Articles molded from this master can themselves be used as a "master," and the term master as used hereinafter is to be understood to include a machined or molded article.

Referring now in detail to the drawing, 10 designates a three part mold to make ball nuts B (FIG. 7) according to the invention. Ball nut B is well known and comprises a tubular member 1 into the inside wall of which are formed three separate, continuous ball races 2, each having a "cross-over," "thread hopping" or ball return portion 3, as is known. Three ball races 2 are shown for illustration only.

Mold 10 comprises a bottom half 11, a top half 12, and a mold pin 13.

Means are provided to insure registry of the top and bottom halves 11, 12 when assembled, and these comprise pins 14 fixed in half 11 and cooperating openings 15 formed in half 12 to receive pins 14. These means are well known and any other mold registering means may be employed.

Bottom half 11 is formed with a central half cylindrical cavity 16, and a coaxial half cylindrical cavity 17 which is longer than cavity 16 but of smaller radius. Cavities 16, 17 form a composite half cylindrical molding cavity. At one end of cavity 17 are ports 18 feeding thereto and extending from an inlet opening 19 on the outside of the half 11 for a purpose hereinafter appearing. On the sides of cavity 17 are coaxial pin receiving cavities 20, 21 and 22 whose function will be explained hereinafter. Cavities 16, 17 and 20 to 22 form a coaxial composite half cylindrical cavity of varying lengths and radii, as is readily apparent. Bottom half 11 is also formed with a port 30 communicating with an inlet opening 31 on the outside of the mold and with cavity 16, for a purpose hereinafter appearing.

Top mold half 12 is formed with a complementary, coaxial, composite half cylindrical cavity 16a, 17a and 20a, 21a and 22a identical to the respective cavities in bottom half 11. As is obvious, a full cylindrical, coaxial composite cavity will be formed upon assembling the mold halves 11 and 12. Cavities 16, 16a and 17, 17a form a composite molding cavity. Top mold half 12 is also formed with ports 18a, 19a, 30a and 31a (not shown) cooperating with ports 18, 18, 30 and 31 respectively, to form complete inlet ports, as is well known.

Mold pin 13 comprises a shank portion 32, the outer end of which is received in cavities 22 and 22a, and the other end of which is received in cavities 20 and 20a, in the assembled mold. Pin 13 also comprises an enlarged disc shaped head 33 which is received in cavities 21 and 21a in the assembled mold. Shank 32 is also formed with a pair of annular grooves 34, 34 which are spaced adjacent the ends of shank portion 32 and located within cavity 17, 17a in the assembled mold for a purpose hereinafter appearing.

Figure 2:
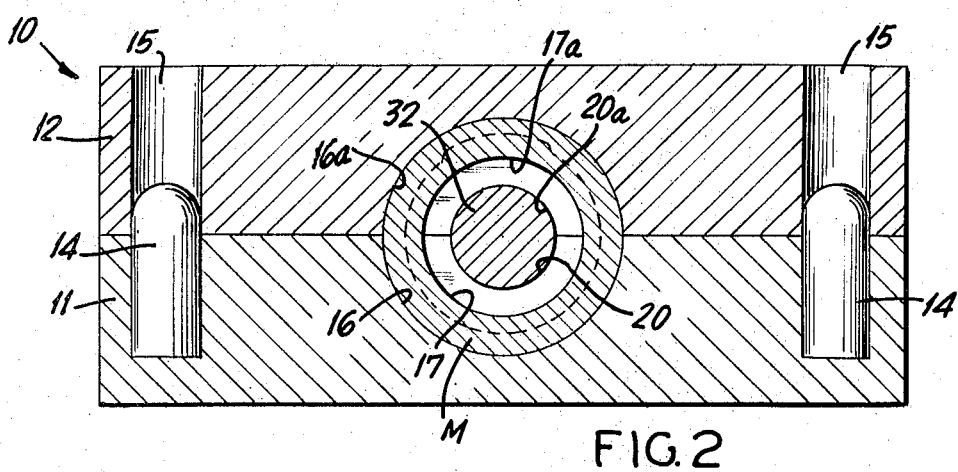
FIG. 2 is a cross-sectional view taken on line 2—2 of FIG. 1 showing the mold assembled to mold the insert.

The steps in the method according to the invention are as follows. A master M is seated in cavity 16 and 16a, with the shank 32 of pin 13 passing therethrough and supported in cavities 21, 21a, 22, 22a and 20, 20a. The mold is now in the position of FIGS. 1 and 2 and is ready to mold the insert I. Suitable molding material is then injected into inlet 19, 19a through ports 18, 18a, and fills the space defined by cavity 17, 17a, the inside surface of the master M which contains the races 2 and cross-overs 3, and the outside of shank 32 within cavity 17, 17a, thus forming insert I. Grooves 34 prevent shrinkage of insert I as it cools thus insuring dimensional stability of the insert I and an accurate copy of the inside surface of master M. Suitable materials for forming insert I have been found to be flexible plastics such as polyethylene, epoxy, polyurethane, or the like, or rubber. Preferably, these materials have a hardness of Shore D durometer 45 to 80, and have a relatively low shrinkage factor.

Figure 3:
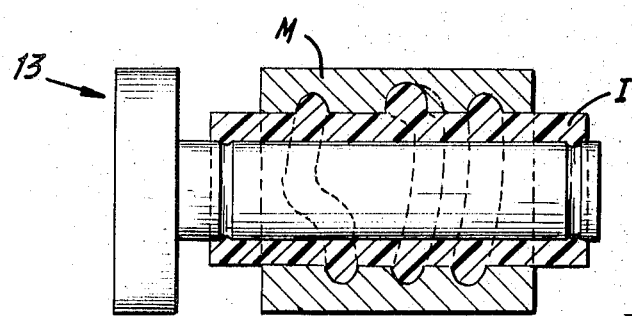
FIG. 3 is a view of the mold pin, with the master and insert thereon shown in cross-section.
Figure 4:
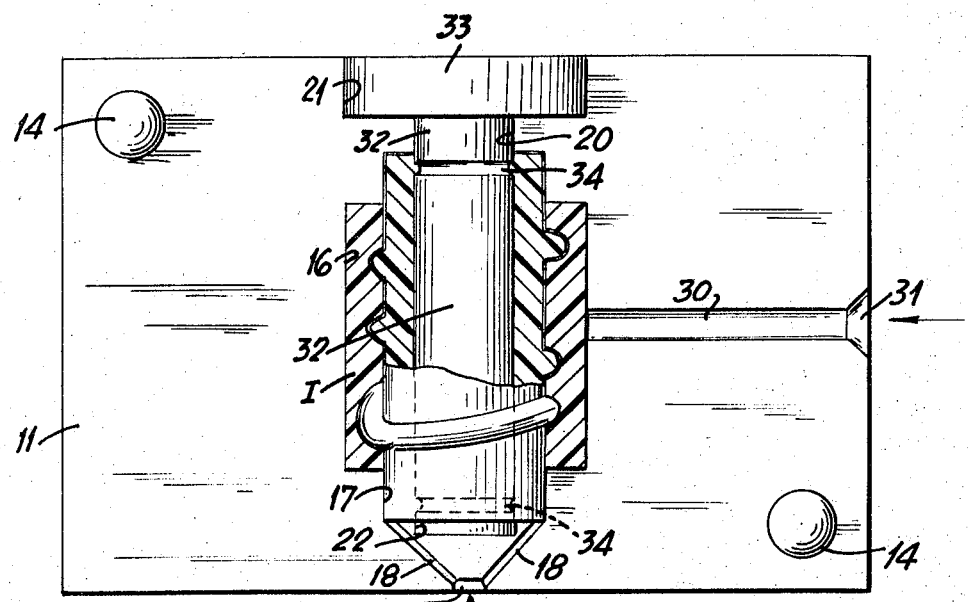
FIG. 4 is a plan view of the bottom half of the mold after molding the article with parts broken away and in cross-section.

The mold halves 11 and 12 are then disassembled, and the pin 13 with the insert I and master M thereon removed, as shown in FIG. 3. The pin is then forceably removed from the insert and master, and then the insert is removed from the master by any suitable means. The insert, being flexible, may be partially collapsed to facilitate its removal from the master. The insert will have ribs 34 which are male copies of grooves 34 in shank 32. The outside surface of insert I will be a seamless male copy of the inside surface of the master M.

The insert I is then remounted on pin 13 with ribs 34a properly locating it thereon by fitting into grooves 34.

The outside surface of insert I may be coated to protect it from deformation due to thermal shock when the ball nut B is molded on it as will be explained hereinafter. A suitable coating material can be heat resistant point, silicone, a metal such as chromium (electro-plated on), heat resisting rubber, epoxy or the like.

The pin and coated insert assembly is replaced in the mold 11 and 12. The mold is now in condition to mold the ball nut B, the space therefor being defined by the outside of insert I and the cavity 16, 16a.

Suitable molding material is injected through the inlet 31, 31a and port 30, 30a to fill this space, thereby forming a ball nut B. Suitable materials for molding the ball nut are nylon, acetal compounds such as Delrin or Celcon, other plastics and similar materials.

Figure 5:
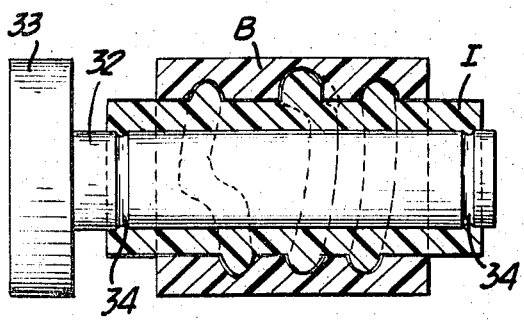
FIG. 5 is a view of the mold pin, with the master and insert thereon shown in cross-section.
Figure 6:
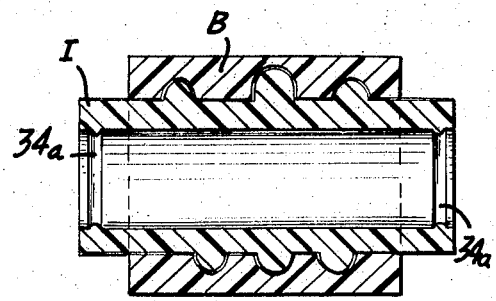
FIG. 6 is a view similar to FIG. 5 showing the mold pin removed.

The pin 13, with the insert I and ball nut B thereon are then removed, see FIG. 5. The pin 13 is forceably removed, FIG. 6, and then the insert I is removed by any suitable means. The insert I can be removed carefully so as to reuse it in molding another ball nut B, or it can be destroyed during removal to facilitate its removal.

Figure 7:
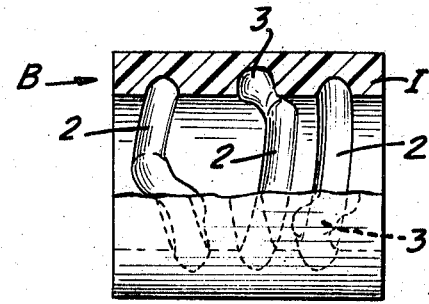
FIG. 7 is a view of the finished molded article partially broken away and in cross-section.

The inside surface of the ball nut B shown in FIG. 7 will be seamless, and the races 2 and cross-overs 3 will be smooth and continuous. The outside surface of the ball nut B will have a seam or parting line on its outside surface and its annular end edges from mold parts 11 and 12, but, as is known, this is not important in the operation of a ball nut.

It will of course be understood that the method according to the invention can also be advantageously used to mold articles which have external undercuts as well as articles which have internal undercuts as explained in detail above in regard to a ball nut; for example, an inner ball bearing race. Also, the method can be used to mold articles which have undercuts that are such that they cannot be filled by ordinary mold members, such as screw members or sliding members.

The method of molding described herein results in dimensional stability of the insert axially and radially.

It will thus be seen that there is provided an apparatus, method and article in which the several objects of this invention are achieved, and which is well adapted to meet the conditions of practical use.

As possible embodiments might be made of the above invention, and as various changes might be made in the embodiment above set forth, it is to be understood that all matter herein set forth and shown in the accompanying drawings, is to be interpreted as illustrative and not in a limiting sense.

I claim:
1. A method of making a tubular molded article having an internal peripherally continuous surface formed with an undercut at its internal surface, terminating short of the ends of said surface, comprising placing in a mold a master of said article, and an axial pin spaced from the internal surface of said master, injecting into the space in the mold between said pin and master molding material to form an insert having an external male surface corresponding to the internal female surface of said master, then opening the mold, removing the pin and stripping the insert from said master, then coating said male surface of the insert with a heat resisting material, replacing the insert on said pin, reinserting the pin with the insert thereon into the mold, and injecting hot molding material into the space in the mold formerly occupied by the master to mold said tubular article.

2. The method of claim 1, in which the mold is provided with space surrounding the pin and extending beyond the ends of the master so that the insert molded around the pin extends in opposite directions beyond the master.

3. The method of claim 2, in which the pin has annular grooves on opposite sides located beyond the ends of the master so that when the insert is molded it will be molded with annular internal ribs at said grooves to prevent contraction in the length of the insert.

4. The method of claim 1, and then opening the mold, removing the pin from the insert, and removing the insert longitudinally from the molded article.

5. The method of claim 4, in which the molding material for the insert, when set, is more flexible, soft and compressible than the molded article when cooled.

6. The method of claim 5, in which the mold is a split mold comprising upper and lower portions having mutually contacting surfaces in the plane of the axis of the pin.

7. The method of claim 1, in which the undercut in the master comprises a helical groove the ends of which are interconnected by a groove deeper than the helical groove.

References Cited by the Examiner
UNITED STATES PATENTS

| | | | |
|---|---|---|---|
| 2,301,338 | 11/1942 | Smith | 264—328 |
| 2,316,143 | 4/1943 | Peebles | 264—226 XR |
| 2,359,948 | 10/1944 | Tillotson | 264—224 |
| 2,714,226 | 8/1955 | Axelrad | 264—328 XR |
| 2,855,792 | 10/1958 | Gates | 74—459 |
| 2,959,978 | 11/1960 | Boutwell | 74—459 |
| 3,021,565 | 2/1962 | Bowman | 264—134 |
| 3,024,081 | 3/1962 | Frost | 264—134 |
| 3,054,145 | 9/1962 | Helpa | 264—318 |

ROBERT F. WHITE, *Primary Examiner.*

R. B. MOFFITT, *Assistant Examiner.*